(12) United States Patent
Agatsuma et al.

(10) Patent No.: US 6,476,857 B1
(45) Date of Patent: Nov. 5, 2002

(54) MULTI-POINT MONITOR CAMERA SYSTEM

(75) Inventors: Mitsuo Agatsuma; Takashi Takahashi; Hisao Ohdawa, all of Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 09/654,387

(22) Filed: Sep. 1, 2000

(30) Foreign Application Priority Data

Aug. 2, 2000 (JP) ........................................ 2000-238861

(51) Int. Cl.[7] .................................................. H04N 7/18
(52) U.S. Cl. ........................ 348/152; 348/153; 348/154; 348/143
(58) Field of Search ................................. 348/143–159, 348/210–220

(56) References Cited

U.S. PATENT DOCUMENTS

| | | | |
|---|---|---|---|
| 5,898,459 A | * 4/1999 | Smith et al. | 348/219 |
| 6,069,653 A | * 5/2000 | Hudson | 348/143 |
| 6,208,379 B1 | * 3/2001 | Oya et al. | 348/213 |
| 6,215,519 B1 | * 4/2001 | Nayar et al. | 348/159 |

FOREIGN PATENT DOCUMENTS

| | | |
|---|---|---|
| EP | 0908846 | 4/1999 |
| JP | 8-139987 | 5/1996 |
| JP | 9-276237 | 10/1997 |
| JP | 360704 | 12/1997 |
| JP | 11-196320 | 7/1999 |

* cited by examiner

*Primary Examiner*—Andy Rao
(74) *Attorney, Agent, or Firm*—Antonelli, Terry, Stout & Kraus, LLP

(57) ABSTRACT

A multi-point surveillance camera system uses a combination of an image recognition unit a zoom camera equipped with a pan/tilt driver unit for changing a camera monitor position, to monitor a plurality of monitor positions. The monitor position is changed by using the pan/tilt unit, and an image recognition unit starts an image recognition process to reliably detect an abnormal entrance at the plurality of monitor positions, after a focus position adjustment by preset information (after completion of commanding to change the monitor position to a preset position or stop at the preset position), after an automatic focusing operation, or after a combination of the focus position adjustment by the preset information and the automatic focusing operation.

12 Claims, 4 Drawing Sheets

MULTI-POINT MONITOR CAMERA SYSTEM

BACKGROUND OF THE INVENTION

The present invention relates to a camera system having a function of monitoring a plurality of view angles and positions and detecting an abnormal entrance from monitored images.

A surveillance camera with a fixed monitor position for detecting an abnormal entrance by an image A recognition process is disclosed in JP-A-9-276237. This monitor camera always takes an image at a fixed monitor position and any change in the image is checked by the image recognition process to detect an abnormal entrance.

Another surveillance camera mounted with a pan/tilt driver unit and a preset unit is disclosed in JP-A-8-139987. This camera is set to take an image at a desired position, and pan, tilt, zoom and focus positions for that position are preset to control the camera monitor position in accordance with the preset values. An image recognition method is not disclosed in this publication.

There is a high demand that a single camera automatically recognizes and watching a plurality of monitor positions and view angles. For automatic recognition of a monitor object, a recognition camera utilizing an image recognition process is known. However, a single focus and fixed view angle camera capable of automatically monitoring a plurality of different view angles and positions is not known.

Products of a combination of a tripod head capable of panning and tilting and a zoom camera for monitoring a plurality of view angles and positions are known. However, although most of these products preset monitor positions and angle views to switch therebetween at high speed and monitor a wide image area, they cannot perform automatic recognition of a monitor object because an image recognition process is not incorporated.

Even if these two kinds of techniques are combined, image recognition may become unstable each time switching occurs among a plurality of view angles and positions. Erroneous recognition may occur and an abnormal entrance cannot be detected reliably.

SUMMARY OF THE INVENTION

It is an object of the present invention to provide a multi-point surveillance camera system capable of obtaining an optimum image recognition result and reliably detecting an abnormal entrance even if the camera is moved to a different preset position or view angle.

In order to achieve the above object of the invention, a combination of an image recognition unit a zoom camera equipped with a pan/tilt driver unit for changing a camera monitor position is used to monitor a plurality of monitor positions. The monitor position is changed by using the pan/tilt unit, and an image recognition unit starts an image recognition process to reliably detect an abnormal entrance at the plurality of monitor positions, after a focus position adjustment by preset information (after completion of commanding to change the focus position to a preset position or stop at the preset position), after an automatic focusing operation (herein-after called an AF operation), or after a combination of the focus position adjustment by the preset information and the automatic focusing operation.

According to another aspect of the invention, a combination of an image recognition unit a zoom camera equipped with a zoom mechanism for changing a camera monitor view angle is used to monitor a plurality of monitor positions, at least two monitor positions having different view angles. The camera monitor view angle is changed in accordance with preset information, and an image recognition unit starts an image recognition process to reliably detect an abnormal entrance at the plurality of monitor positions, after completion of changing to the present position or completion of an operation by the zoom mechanism, after completion of setting an in-focus state by the automatic focusing operation, or after a combination of the focus position adjustment by the preset information and the automatic focusing operation.

According to the invention, the image recognition unit starts the image recognition process after the automatic focusing operation, at the same time when the automatic focusing operation starts, a timer is activated, if the in-focus state does not enter in a predetermined time lapse, the focus position is forcibly set to the preset position, and thereafter the image recognition unit starts the image recognition process to reliably detect an abnormal entrance at a plurality of monitor positions.

DESCRIPTION OF THE EMBODIMENT

An embodiment of the invention will be described with reference to FIGS. 1 to 6.

Figure 1:
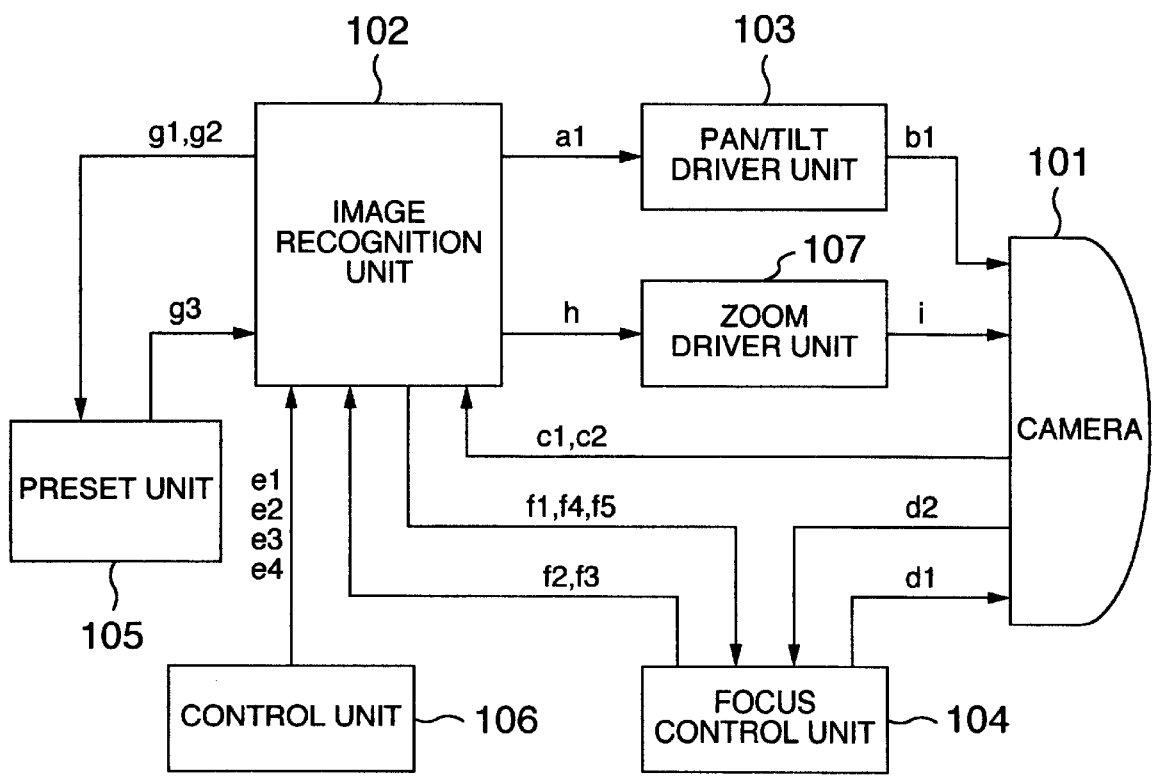
FIG. 1 is a block diagram showing the structure of a multi-point surveillance camera system according to an embodiment of the invention.

FIG. 1 is a block diagram showing the structure of a multi-point surveillance camera system according to the embodiment of the invention. In FIG. 1, reference numeral 101 represents a camera. Reference numeral 102 represents an image recognition unit for calculating a change in an image by an image recognition process and detecting any intruder if any. Reference numeral 103 represents a pan/tilt driver unit for driving a pan/tilt mechanism of the camera. Reference numeral 104 represents a focus control unit for controlling a focus position in order to adjust the focal point. Reference numeral 105 represents a preset unit for storing pan, tilt, zoom and focus positions and a background image. Reference numeral 106 represents a control unit for performing a pan-tilt control, a zoom control and a preset operation. Reference numeral 107 represents a zoom driver unit for changing the size of a view angle.

The operation of the multi-point camera system having the structure as above will be described. First, an monitoring operation through pan/tilt driving will be described.

Figure 2:
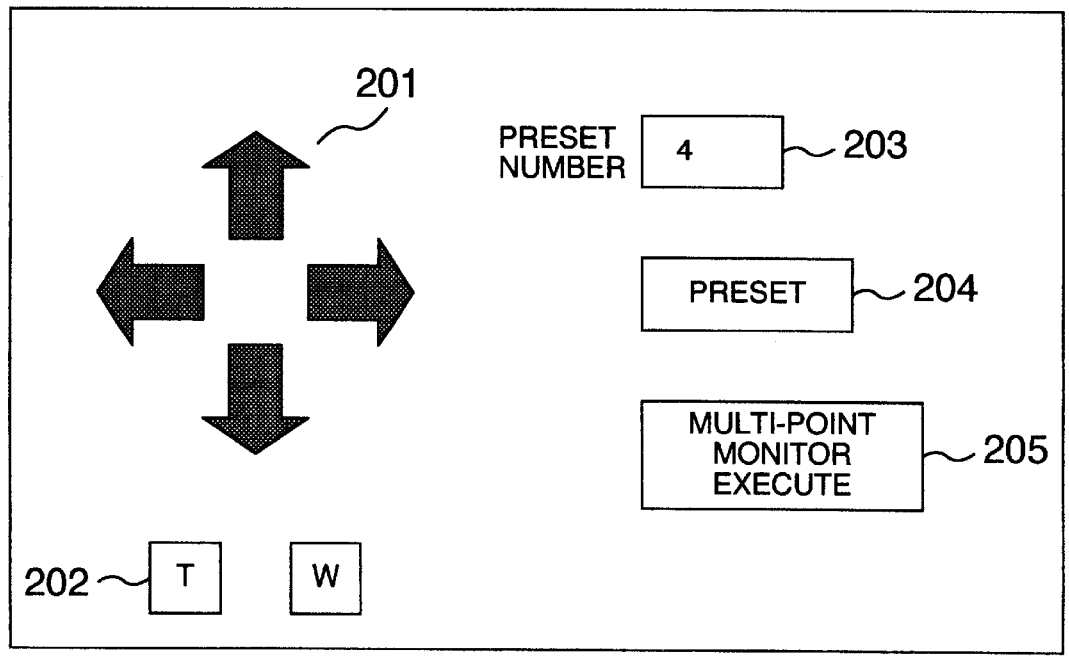
FIG. 2 shows an example of a GUI display screen of a controller.

FIG. 2 shows an example of a GUI display screen of the control unit 106. As a user manipulates a pan/tilt button 201 on the GUI display screen shown in FIG. 2, the control unit 106 outputs a pan motion target position and a tilt motion target position e1 to the image recognition unit 102. The image recognition unit 102 supplies a pan/tilt motion target position a1 to the pan-tilt driver unit 103. The image recognition unit 102 stores the present pan/tilt position. The pan/tilt driver unit 103 outputs a drive control signal b1 to the camera 101 to change the pan and tilt positions and set the camera monitor position.

For a zoom operation, as a user manipulates a zoom button 202, the control device 106 outputs a zoom position e4 to the image recognition unit 102. The image recognition unit 102 outputs a zoom position h to the zoom driver unit 107. The image recognition unit 102 stores the present zoom position. The zoom driver unit 107 outputs a zoom control signal i to the camera 101. The camera 101 drives its zoom mechanism to change the size of a view angle of an image. When the camera 101 stops, the camera 101 outputs a camera motion stop signal c2 to the image recognition unit 102. An automatic focusing (AF) operation is executed by using the camera 101, the focus control unit 104 having the focus mechanism and the image recognition unit 102. When the image recognition unit 102 confirms from the camera motion stop signal c2 that the camera motion stopped, it outputs an AF activation request signal f1 to the focus control unit 104.

The focus control unit 104 outputs a focus drive amount signal d1 to the camera 101 so that the focus position of the camera is moved by an amount corresponding to the focus drive amount signal d1. The camera 101 outputs an image signal d2 to the focus control unit 104. In accordance with this image signal d2, an in-focus judgement process is executed. The focus control unit 104 outputs an focusing operation completion signal f2 and a focus position f3 to the image recognition unit 102. The image recognition unit 102 stores the present focus position. When the image recognition unit 102 confirms an in-focus state from the focusing operation completion signal f2, the image recognition unit 102 starts an image recognition process which always checks a change amount of a monitor image input through a lens of the camera 101 in accordance with the image signal c1 representative of the monitor image and detects an abnormal entrance if any.

Next, a preset operation will be described. A user manipulates a preset number setting button 203 to designate a preset number "14". Then, the user manipulates a preset button 204. The control unit 106 outputs the preset number and a preset request e2 to the image recognition unit 102. The image recognition unit 102 always acquires camera information and outputs present camera pan, tilt, zoom (view angle) and focus positions, an input image, and a preset number g1 to the preset unit 105. The preset unit 105 stores the pan, tilt, zoom (view angle) and focus positions, and the input image (background image) corresponding to the preset number "4" in a memory region for the preset number "4".

Next, a multi-point monitoring operation using the preset data will be described.

As a user manipulates a multi-point monitor execute button 205, the control unit 106 outputs a multi-monitor execute request e3 to the image recognition unit 102. The image recognition unit 102 outputs a preset data request g2 for a preset number "1" to the preset unit 105. The preset unit 105 outputs preset data g3 to the image recognition unit 102. If the preset data does not exist, empty data is output. If the preset data does not exist, the image recognition unit 102 outputs the preset data request g2 to the preset unit 105 by changing the preset number until the preset data is found. If the preset number exceeds the maximum preset number, an output of the preset data request g2 is terminated. If the preset data exists, the image recognition unit 102 outputs the pan/tilt motion target position a1 to the pan/tilt driver unit 103. The pan/tilt driver unit 103 outputs the drive control signal b1 to the camera 101 to change the camera monitor position through a pan/tilt operation. The image recognition unit 102 also outputs the zoom position h to the zoom driver unit 107. The image recognition unit 102 stores the present zoom position. The zoom driver unit 107 outputs the zoom control signal i to the camera 101. The camera 101 drives its zoom mechanism to change the size of a view angle of the monitor image. When the camera 101 stops, the camera 101 outputs the camera motion stop signal c2 to the image recognition unit 102. When the image recognition unit 102 confirms from the camera motion stop signal c2 that the camera motion stopped, it outputs a focus motion target position f4 to the focus control unit 104, in accordance with the preset focus position.

The focus control unit 104 outputs the focus drive amount signal d1 to the camera 101 so that the focus position of the camera 101 is moved by an amount corresponding to the focus drive amount signal d1. The camera 101 outputs the image signal d2 to the focus control unit 104. In accordance with this image signal d2, the focus control unit 104 judges whether the focus is set to the in-focus state. The focus control unit 104 outputs the focusing operation completion signal f2 to the image recognition unit 102.

When the image recognition unit 102 confirms an in-focus state from the focusing operation completion signal f2, the image recognition unit 102 starts an image recognition process to detect an abnormal entrance if any. If it is judged that the focus is not in the in-focus state, the image recognition unit 102 outputs the AF activation request signal f1 to the focus control unit 104. At the same time, a timer starts operating. The focus control unit 104 starts the AF operation and outputs the lens drive amount d1 to the camera 101. The camera 101 changes its focus position by an amount corresponding to the lens drive amount d1. The camera 101 outputs the image signal d2. In accordance with the image signal d2, the focus control unit 104 judges whether the focus is in the in-focus state. The focus control unit 104 outputs the in-focus operation completion signal f2 and the focus position f3 to the image recognition unit 102. The focus control unit 104 outputs the focus position to the camera 101 and continues the AF operation, until it is judged that the focus is in the in-focus state. The image recognition unit 102 stores the present focus position represented by the focus position f3.

The image recognition unit 102 judges the in-focus state from the in-focus state operation completion signal f2. The in-focus judgment by the image recognition unit 102 is made in a predetermined time duration after the start of the AF operation as counted with the timer, and then the image recognition unit 102 starts the image recognition process to detect an abnormal entrance if any. If the in-focus judgement is not made in the predetermined time duration, the image recognition unit 102 outputs an AF forcible stop request f5 to the focus control unit 104. The focus control unit 104 stops the AF operation. The image recognition unit 102 again outputs the focus motion target position f4 to the focus control unit 104. The focus control unit 104 outputs the lens drive amount d1 to the camera 101. The camera 101 changes its focus position by an amount corresponding to the lens drive amount d1. The image recognition unit 102 starts the image recognition process to detect an abnormal entrance if any.

An abnormal entrance is detected as in the following. An image difference calculated through a normalized correlation calculation between the preset background image and the present input image, and a calculated monitor object area and shape difference, are compared with judgement threshold values. If the image recognition results are in a range of the judgement threshold values (object area, shape and so on), while the image difference is more than a certain value, it is judged that there is an abnormal entrance. After the abnormal entrance detection process, the image recognition unit 102 outputs the preset data request g2 for the next preset number to the preset unit 105 to execute the monitor operation for the next preset number and repeat the above-described operations.

The image recognition process may be started after the camera is moved to the focus position corresponding to each preset position, without executing the AF operation. However, as described above, if the AF operation is executed, the camera can reliably follow a monitor object (including a moving object) or an obstacle in the image to be caused by an abnormal entrance, so that a monitor image having a good focusing state can be obtained and the image recognition precision can be improved.

Figure 3:
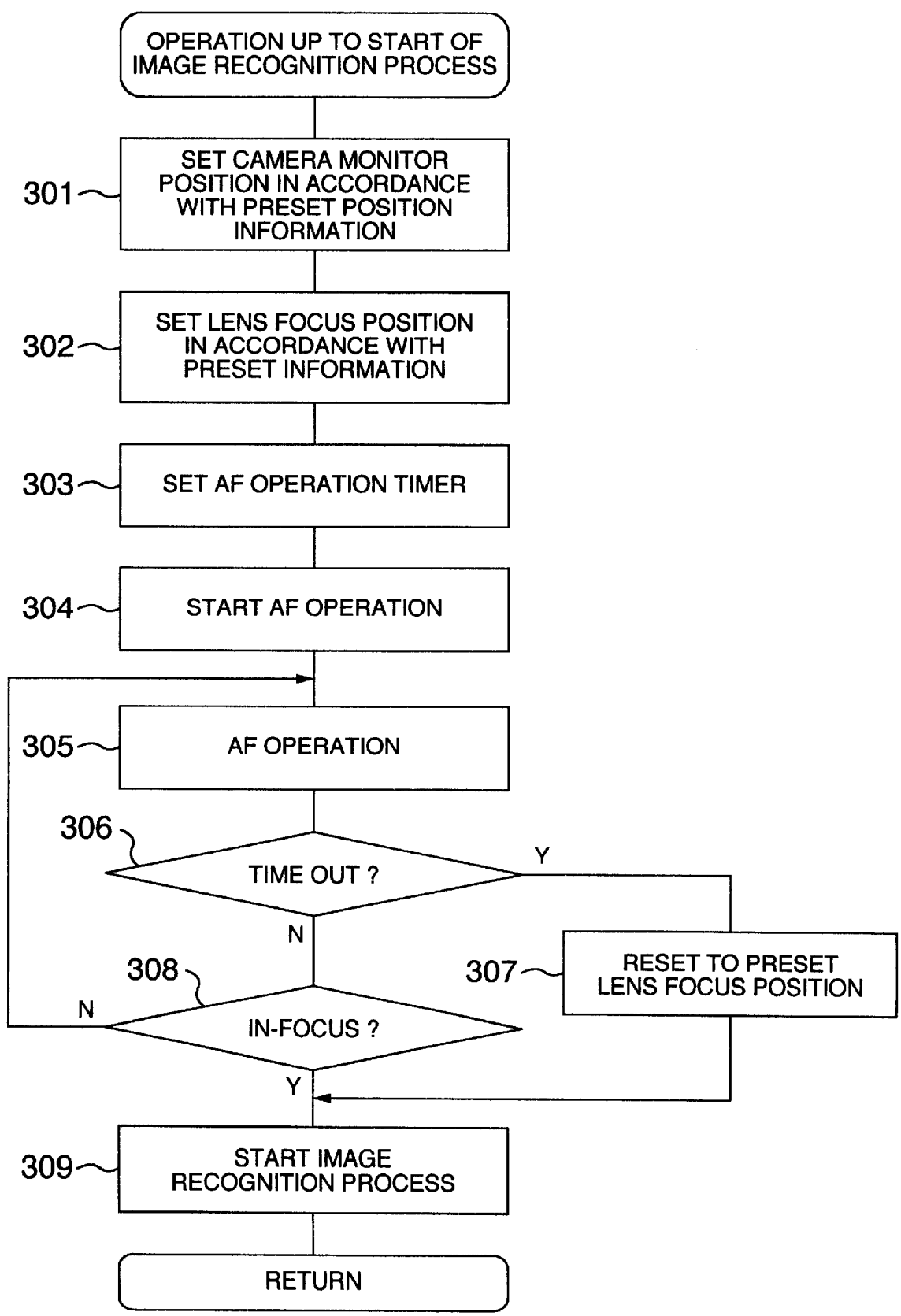
FIG. 3 is a flow chart illustrating an operation up to a start of an image recognition process.

Next, a process up to the start of an image recognition process will be described. A combination of the camera monitor position, the pan, tilt, and focus positions for each monitor position is stored in accordance with preset information, and the focus position of the lens is changed. FIG. 3 is a flow chart illustrating the operation up to the start of an image recognition process. At Step 301 in accordance with preset information, the camera monitor position such as the pan and tilt positions for each monitor position is set in accordance with preset camera position information. At Step 302 the lens focus position is set in accordance with information such as the view angle size corresponding to each preset monitor view angle and a lens focus position.

Thereafter, at Step 303 an AF operation timer is started. At Step 304 the AF operation starts. If the background image is a flat image with less edges such as a wall, it takes a long time to complete the AF operation, and at the worst the AF operation may not be completed. In such a case, the time-out of the timer occurs at Step 306. At Step 307 the focus position is again set to the preset lens focus position to move the focus position to that of the background image.

In this state, the image recognition process starts at Step 309. In this manner, a delay of the start of the image recognition process is suppressed. If the in-focus state is set in the predetermined time duration, then the image recognition process starts at Step 309. In this manner, the image recognition process can start and an optimum monitor image can be obtained.

Figure 4:
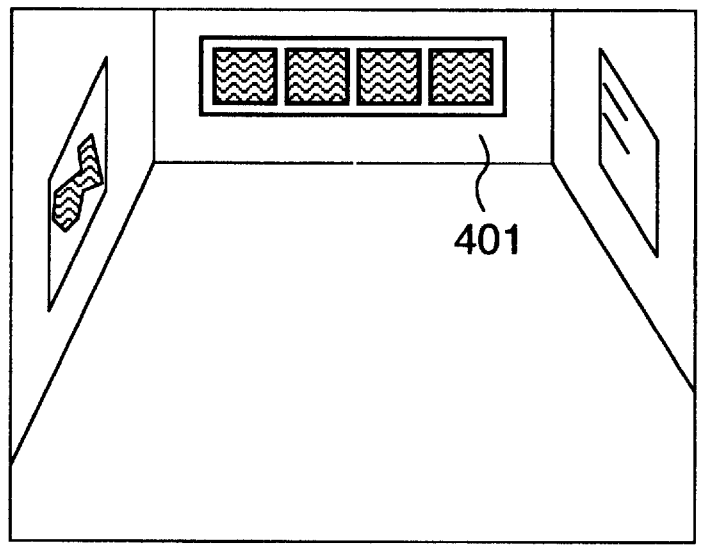
FIG. 4 shows an example of an image without any intruder.

Next, the AF operation and the image recognition process will be described. FIG. 4 shows an example of an image without any intruder. The AF focus position is at a background image 401. A difference between an input monitor image and the preset background image is used for detecting an abnormal entrance. In this example, this difference is not detected and no abnormal entrance is detected.

Figure 5:
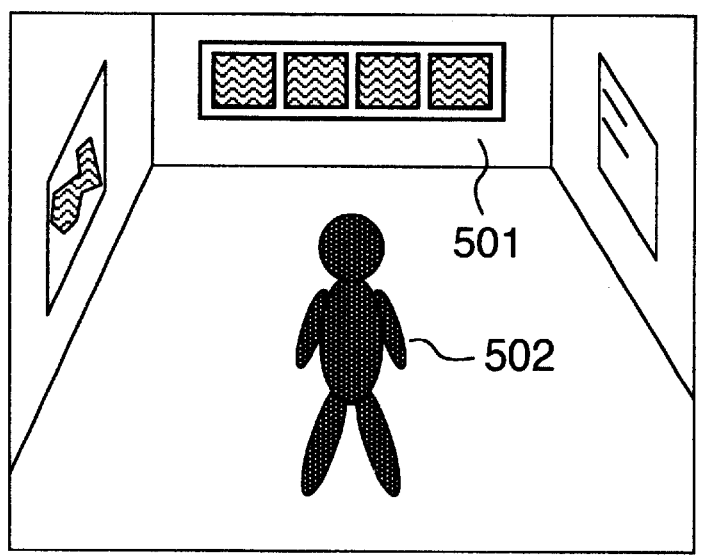
FIG. 5 shows an example of an image with an intruder near to the camera.

FIG. 5 shows an example of an image with an intruder near to the camera. Reference numeral 501 represents the background image, and reference numeral 502 represents an intruder image. In this case, the AF focus position is at the intruder image 502. Therefore the background image 501 is an out-of-focus image. With the image recognition process, a difference between the preset background image and the input monitor image is used for detecting an abnormal entrance. An area in which an abnormal entrance is to be detected by using the difference can be set as desired. If the whole display screen is set as such an area, a difference between the intruder image 502 and the out-of-focus background image 501 appears so that an abnormal entrance can be detected. In this case, a precision of the image recognition process can be improved further if the out-of-focus background image is judged as the background image from the preset background image and if it is judged the intruder image is not contained in the preset background image.

As above, if the background image is remote from the camera and the intruder is near to the camera, good image recognition can be performed by executing the AF operation.

Figure 6:
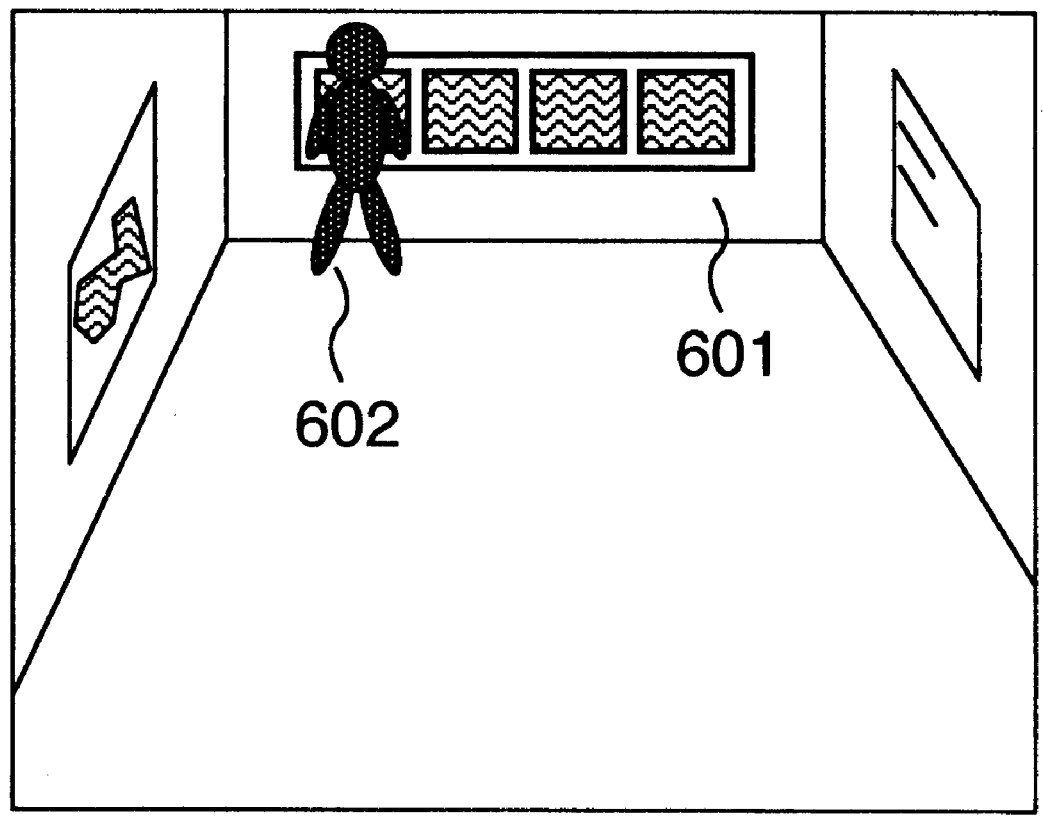
FIG. 6 shows an example of an image with an intruder remote from the camera.

FIG. 6 shows an example of an image with an intruder remote from the camera. Reference numeral 601 represents the background image and reference numeral 602 represents an intruder image. In this case, the AF focus position is approximately at the background image. A difference between the preset background image and the intruder image appears.

As described so far, according to the present invention, even if the camera is moved to a different position or it takes a different view angle during multi-point monitoring, the AF operation is completed after the preset focus position adjustment or after the AF operation. Accordingly, the image recognition can be performed by using a stable monitor image, and an abnormal entrance can be detected reliably. Furthermore, since the preset focus position adjustment and the AF operation are combined, the focusing time can be shortened, the start and end of the image recognition process can be made earlier and the abnormal entrance detection precision can be improved.

What is claimed is:

1. A multi-point monitor camera system comprising:
    a pan/tilt driver unit for changing a camera monitor position to monitor a plurality of monitor positions;
    a focusing mechanism for changing a focus position of a lens to adjust a focal point;
    automatic focusing means; and
    image recognition means for detecting a change amount of a monitor image input via a camera lens and detecting an abnormal entrance of an object;
    wherein the abnormal entrance at the plurality of monitor positions is detected by making the image recognition means start an image recognition operation after an automatic focusing operation by the automatic focusing means is completed.

2. A multi-point monitor camera system comprising:
    a pan/tilt driver unit for changing a camera monitor position to monitor a plurality of monitor positions;
    a focusing mechanism for changing a focus position of a lens to adjust a focal point;
    automatic focusing means;
    image recognition means for detecting a change amount of a monitor image input via a camera lens and detecting an abnormal entrance of an object; and
    preset means for storing a combination of pan, tilt, and focus positions for each monitor position and a background image corresponding to the combination;
    wherein the monitor position for the camera is changed in accordance with preset information stored in the preset means; and
    wherein after completion of changing to a preset position or after a stop at the preset position, the automatic focusing means executes an automatic focusing operation for a monitor object, and thereafter the image recognition means starts an image recognition operation to detect the abnormal entrance at the plurality of monitor positions.

3. A multi-point monitor camera system comprising:

a pan/tilt driver unit for changing a camera monitor position to monitor a plurality of monitor positions;

a focusing mechanism for changing a focus position of a lens to adjust a focal point;

automatic focusing means;

image recognition means for detecting a change amount of a monitor image input via a camera lens and detecting an abnormal entrance of an object; and preset means for storing a combination of pan, tilt, and focus positions for each monitor position and a background image corresponding to the combination;

wherein the monitor position for the camera is changed in accordance with preset information stored in the preset means; and wherein after completion of a command to change the monitor position to a preset position or after a stop at the preset position, the automatic focusing means executes an automatic focusing operation for a monitor object, thereafter the image recognition means starts an image recognition operation, at the same time when the automatic focusing operation is executed, a timer is activated, if an in-focus state is not achieved after a predetermined time lapse, the focus position is forcibly set to the preset position, and thereafter the image recognition means starts the image recognition operation to detect the abnormal entrance at the plurality of monitor positions.

4. A multi-point monitor camera system comprising:

a focusing mechanism for changing a focus position of a lens;

automatic focusing means;

a zoom mechanism for changing a camera monitor view angle to monitor a plurality of monitor positions, at least two monitor positions having different view angles;

storage means for storing a background image having at least one or more view angles; and image recognition means for detecting a change amount of a monitor image input via a camera lens and detecting an abnormal entrance of an object;

wherein the abnormal entrance at the plurality of monitor positions is detected by making the image recognition means start an image recognition operation after an operation by the zoom mechanism or after completion of an operation by the automatic focusing means.

5. A multi-point monitor camera system comprising:

a focusing mechanism for changing a focus position of a lens;

automatic focusing means;

a zoom mechanism for changing a camera monitor view angle to monitor a plurality of monitor positions, at least two monitor positions having different view angles;

preset means for storing a zoom position for each monitor angle and a corresponding background image; and image recognition means for detecting a change amount of a monitor image input via a camera lens and detecting an abnormal entrance of an object;

wherein the camera monitor view angle is changed in accordance with preset position information stored in the preset means; and wherein after completion of changing to a preset position or after completion of an operation by the zoom mechanism, the automatic focusing means executes an automatic focusing operation for a monitor object, and thereafter the image recognition means starts an image recognition operation to detect the abnormal entrance at the plurality of monitor positions.

6. A multi-point monitor camera system comprising:

a focusing mechanism for changing a focus position of a lens;

automatic focusing means;

a zoom mechanism for changing a camera monitor view angle to monitor a plurality of monitor positions, at least two monitor positions having different view angles;

preset means for storing a zoom position for each monitor angle and a corresponding background image; and image recognition means for detecting a change amount of a monitor image input via a camera lens and detecting an abnormal entrance of an object;

wherein the camera monitor view angle is changed in accordance with preset position information stored in the preset means; and wherein after completion of changing to a preset position or after completion of an operation by the zoom mechanism, the automatic focusing means executes an automatic focusing operation for a monitor object, thereafter the image recognition means starts an image recognition operation, at the same time when the automatic focusing operation is executed, a timer is activated, if an in-focus state is not achieved after a predetermined time lapse, the focus position is forcibly set to the preset position, and thereafter the image recognition means starts the image recognition operation to detect the abnormal entrance at the plurality of monitor positions.

7. A multi-point monitor camera system according to claim 1, wherein the automatic focusing means automatically determines a focus position of the lens without intervention of a user.

8. A multi-point monitor camera system according to claim 2, wherein the automatic focusing means automatically determines a focus position of the lens without intervention of a user.

9. A multi-point monitor camera system according to claim 3, wherein the automatic focusing means automatically determines a focus position of the lens without intervention of a user.

10. A multi-point monitor camera system according to claim 4, wherein the automatic focusing means automatically determines a focus position of the lens without intervention of a user.

11. A multi-point monitor camera system according to claim 3, wherein the automatic focusing means automatically determines a focus position of the lens without intervention of a user.

12. A multi-point monitor camera system according to claim 6, wherein the automatic focusing means automatically determines a focus position of the lens without intervention of a user.

* * * * *